United States Patent
Petrucci et al.

(10) Patent No.: US 9,612,997 B1
(45) Date of Patent: Apr. 4, 2017

(54) MULTI-CORE PROCESSING UNIT

(71) Applicant: GM GLOBAL TECHNOLOGY OPERATIONS LLC, Detroit, MI (US)

(72) Inventors: David R. Petrucci, Warren, MI (US); David Heiden, Clarkston, MI (US); Charles A. Massoll, Milford, MI (US); Duane S. Carper, Davison, MI (US)

(*) Notice: Subject to any disclaimer, the term of this patent is extended or adjusted under 35 U.S.C. 154(b) by 0 days.

(21) Appl. No.: 15/156,448

(22) Filed: May 17, 2016

(51) Int. Cl.
| | |
|---|---|
| *G06F 15/80* | (2006.01) |
| *B60R 21/013* | (2006.01) |
| *G06F 13/40* | (2006.01) |
| *G06F 13/362* | (2006.01) |
| *H04L 29/08* | (2006.01) |

(52) U.S. Cl.
CPC .......... *G06F 15/80* (2013.01); *B60R 21/013* (2013.01); *G06F 13/362* (2013.01); *G06F 13/4068* (2013.01); *G06F 13/4072* (2013.01); *H04L 67/12* (2013.01)

(58) Field of Classification Search
CPC .... G06F 15/80; G06F 13/4072; G06F 13/362; G06F 13/4068; H04L 67/12; B60R 21/013
See application file for complete search history.

(56) References Cited

U.S. PATENT DOCUMENTS

| | | | | | |
|---|---|---|---|---|---|
| 5,121,386 | A * | 6/1992 | Wolfsgruber | ....... | B60R 16/0315 370/462 |
| 5,699,250 | A * | 12/1997 | Kobayashi | .......... | B60R 16/0315 701/1 |
| 6,161,066 | A * | 12/2000 | Wright | ................ | B60Q 1/2611 340/468 |
| 7,082,359 | B2 * | 7/2006 | Breed | .................... | G07C 5/008 701/31.5 |
| 7,313,467 | B2 * | 12/2007 | Breed | .................... | G07C 5/008 307/9.1 |
| 9,014,888 | B2 * | 4/2015 | Sukkarie | ................ | G01C 21/26 701/22 |
| 9,020,697 | B2 * | 4/2015 | Ricci | ..................... | H04W 48/04 701/36 |
| 2009/0258642 | A1 * | 10/2009 | Golenski | ................ | G08G 1/205 455/426.1 |
| 2012/0265379 | A1 * | 10/2012 | Chen | ....................... | B61L 3/006 701/20 |
| 2015/0025704 | A1 * | 1/2015 | Horihata | ................. | H04L 12/12 700/297 |
| 2016/0277208 | A1 * | 9/2016 | Petrucci | ............ | H04L 12/40013 |

* cited by examiner

*Primary Examiner* — Evan Pert
(74) *Attorney, Agent, or Firm* — Reising Ethington, P.C.; Lionel D. Anderson (57) ABSTRACT

A vehicle communication system that includes a plurality of functional system modules (FSMs) and a master system module (MSM) coupled to the FSMs. The MSM includes a multi-core processing unit that includes multiple functioning core assemblies (FCAs) and a managing core assembly (MCA). Each FCA includes a substrate carrying a core CPU and an optical interface circuit carried by a first edge of the substrate. The MCA includes a substrate having a first and second major surfaces—the first major surface includes a plurality of rows of electrical connections, each of which are adapted to couple with one of the FCAs to enable communication between the core CPU (of MCA) and the core CPUs (of the FCAs). Each of the FCAs may have a second edge that abuts the first major surface at one of the plurality of rows of electrical connections.

19 Claims, 11 Drawing Sheets

MULTI-CORE PROCESSING UNIT

FIELD

The present disclosure pertains to a multi-core processing unit, and more particularly, it pertains to a multi-core processing unit for an optical communication system in a vehicle.

BACKGROUND

There is a demand in modern vehicles to handle increasing numbers of electronic functions and controls. Conventionally, when a vehicle acquires a new functionality, additional hardware, additional wiring, additional space, etc. is required. Typically, this also increases vehicle weight and costs. Thus, there is a need for a vehicle communication architecture that can support the increasing number of vehicle functions and controls, as well as the increasing demand for high-speed electronic operations, and the like.

SUMMARY

According to one embodiment, there is provided a vehicle communication system that includes a plurality of functional system modules and a master system module coupled to the plurality of functional system modules. The master system module includes a multi-core processing unit that includes a plurality of functioning core assemblies (FCAs) and a managing core assembly (MCA). The FCAs each may have a substrate carrying a core central processing unit (CPU) and an optical interface circuit carried by a first edge of the substrate, wherein the optical interface circuit is adapted to enable communication between the respective FCA and at least one of the plurality of functional system modules. The MCA may include a substrate having a first major surface and a second major surface. The first major surface may include a plurality of rows of electrical connections. Each of the plurality of rows of electrical connections may be adapted to couple with one of the plurality of FCAs to enable communication between the core CPU of the MCA and the core CPUs of the plurality of FCAs. And each of the plurality of FCAs may have a second edge that abuts the first major surface at one of the plurality of rows, wherein the second edge is opposite the first edge through a height of the respective FCA.

According to another embodiment, there is provided a multi-core processing unit adapted to be carried by a circuit card. The multi-core processing unit includes a managing core assembly (MCA), a first functioning core assembly (FCA), and a second functioning core assembly (FCA). The MCA includes: a substrate having a base carrying a core central processing unit (CPU); an electrical matrix circuit coupled to the core CPU of the MCA; and a plurality of contacts on the substrate adapted to establish electrical connection with the circuit board. Each of the first and second FCAs may include a substrate, each FCA substrate carrying a core CPU. The substrate frames of the first and second FCAs may be carried by a major surface of the MCA, wherein, via the matrix circuit, the core CPU of the MCA may be configured to control communication between the core CPUs of the first and second FCAs.

DRAWINGS

Preferred exemplary embodiments will hereinafter be described in conjunction with the appended drawings, wherein like designations denote like elements, and wherein.

DESCRIPTION

The system described below pertains to a multi-core processing unit (sometimes simply referred to as a processing unit) that is capable of high speed or broadband communication. The disclosed processing unit includes a number of core central processing units (CPUs), including one core unit CPU that manages the remaining core CPUs. The multi-core processing unit is compact, and its accompanying architecture represents a reduction in weight and cost when compared to conventional systems, as will be explained below. In addition, the processing unit is capable of processing a number of parallel processes at high-speed data rates. By way of example only, the processing unit is described in an optical communication system of a vehicle having a centralized architecture. It will be appreciated that there is a demand in modern vehicles to be capable of executing an increasing number of parallel processes. According to at least one embodiment, the multi-core processing unit is capable of executing vehicle parallel processes—including those which require relatively high bandwidths, as will be explained more below.

Figure 1:
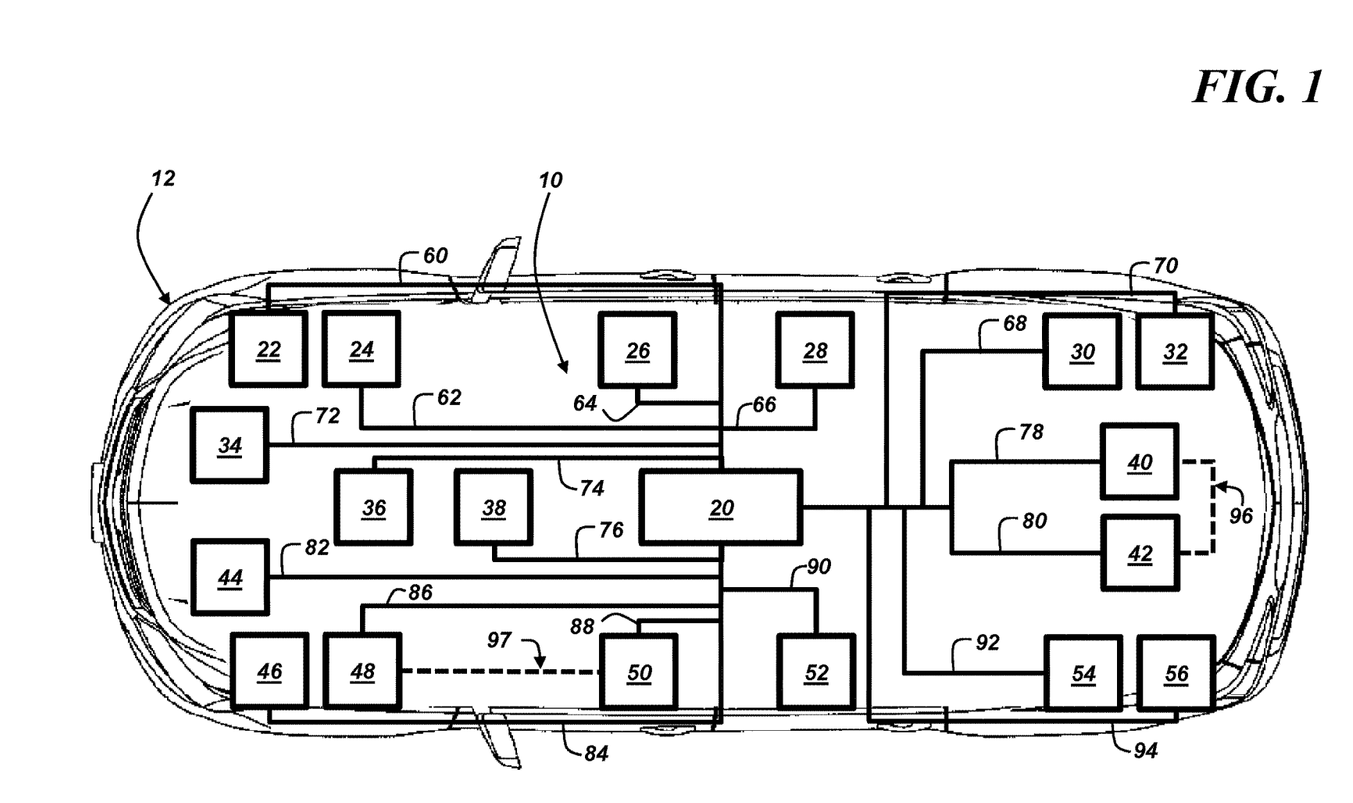
FIG. 1 is a schematic view of a vehicle having a communication system.

With reference to FIG. 1, there is shown a schematic diagram of a communication system 10 for a vehicle 12 that includes a master module or master system module 20 that includes a multi-core processing unit (discussed below) and a number of functional modules or functional system modules 22-56. For example, in this exemplary centralized architecture, each of the functional modules 22-56 are individually electrically and/or optically coupled to the master module 20 via a communication link or nodal connection (60-94), respectively. In this manner, the master module 20 may facilitate parallel processes as desired in two or more of the functional modules 22-56. In one embodiment, the master module 20 may conduct parallel processes in all functional modules 22-56 concurrently. Of course, the architecture need not be limited to a centralized embodiment and/or may not require the various components shown in FIG. 1. For example, the illustrations and description are intended only to show one exemplary embodiment; others exist. In one implementation, at least some of the functional modules 22-56 also are connected to one another (e.g., via an inter-connection such as a nodal connection 96, 97 or the like). Other implementations may have additional master modules, more or fewer functional modules, etc.

System 10 may be utilized in any type of vehicle including, but certainly not limited to, passenger cars, sports utility vehicles (SUVs), trucks, motorcycles, recreational vehicles (RVs), marine vessels, aircraft, etc. Moreover, the master module and multi-core processing unit disclosed herein may be used in other communication systems as well (e.g., such as buildings and other infrastructure) and are not limited to the system 10 shown in FIG. 1.

Functional modules 22-56 can be designed to execute or perform most or even all of the functions or tasks in a particular zone or area of the vehicle 12, e.g., under the control of the master module 20, as will be described more below. In some instances, the modules 22-56 may be coupled to various local hardware devices, and one or more of the modules may have suitable control electronics (e.g., including a local processor (not shown), local memory (not shown), instructions or code stored on the local memory that is executable by the local processor, etc.) In at least one embodiment, the size, weight, and computing power of the functional modules 22-56 may be limited as more time-intensive processing functions or tasks can be carried out at the master module 20. For example, the master module 20 may execute processing instructions or operations and then, based on the processing, operations, and the like, communicate one or more commands to the respective functional modules 22-56 via the connections 60-94. Thus, in at least one embodiment, the functional modules 22-56 either may have no local processor, or may have a local processor that has substantially less computing speed or capability than that of the master module 20. In this manner, functional modules 22-56 may be more compact, cost less to manufacture, and have other appreciable benefits as a result of at least some computations being performed centrally at the master module 20.

To illustrate, functional modules 22, 32, 46, 56 could be associated with a collision avoidance system and may include a network of sensors such as cameras, RADAR, LIDAR, inertial sensors, and the like which are collectively adapted to sense or predict potential collision scenarios. In at least one example, the modules 22, 32, 46, 56 may provide sensor data to the master module 20 via connections 60, 70, 84, 94 (respectively), and module 20 then may execute an algorithm or instructions to determine whether a collision scenario is present based on the sensed data. Further, master module 20 could control these or other functional modules to perform a safety operation in response to the determination to positively assist a vehicle driver to avoid a collision—e.g., master module 20 could control an automated braking procedure or the like. This of course is merely an example to illustrate the interaction between the functional modules 22-56 and the master module 20. The modules 22, 32, 46, 56 may be adapted to perform other tasks in addition to or instead of those discussed here. An embodiment of master module 20 is described below which is capable of carrying out the functions described above.

Figure 2:
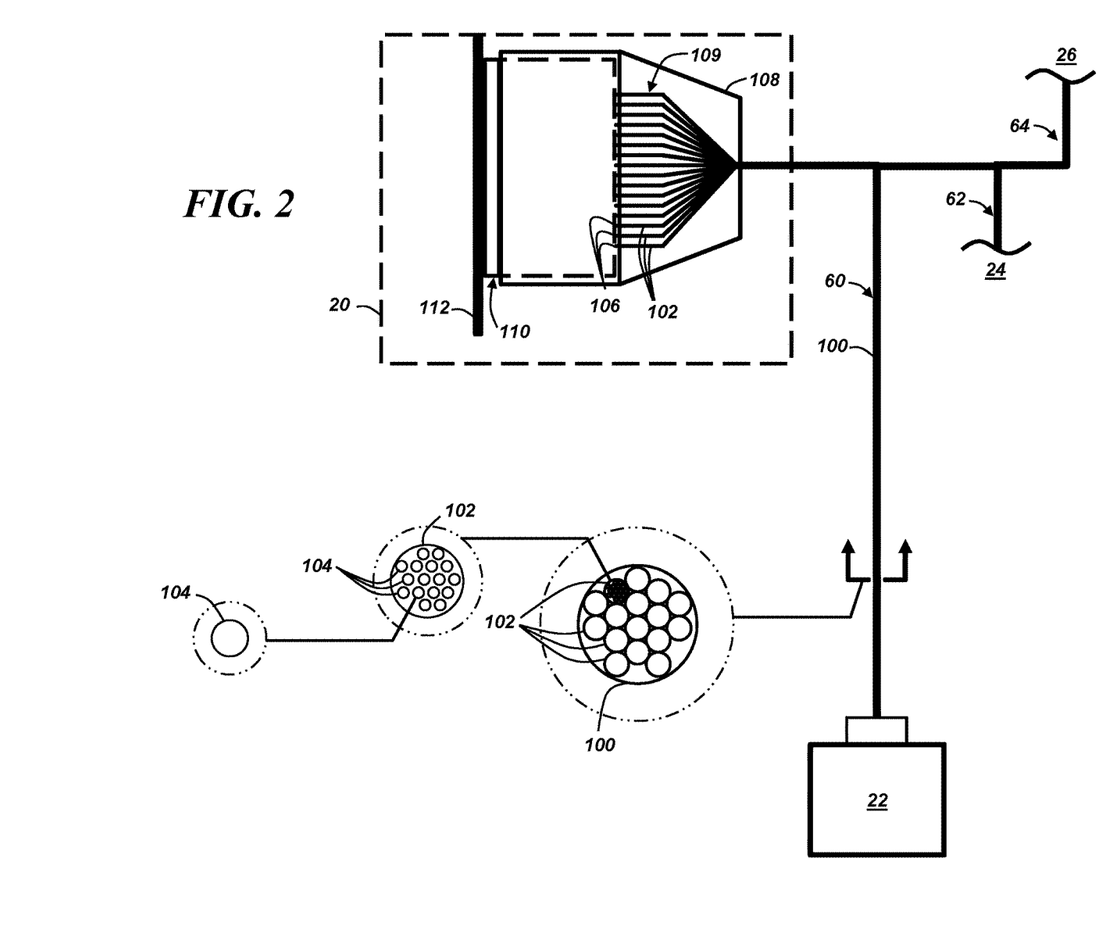
FIG. 2 is a schematic diagram of an optical data cable that may be used with the communication system of FIG. 1.

As discussed above, each of the connections 60-94 may extend between and facilitate a communication link between the master module 20 and functional modules 22-56. The construction of each connection 60-94 may be identical or similar; therefore, only one connection is described hereafter. As shown in FIG. 2, connection 60 may comprise a harness bundle or fiber optic cable 100 that comprises multiple fiber optic pipes or light pipes 102—each pipe 102 comprising multiple fiber optic strands 104. Each strand 104 can be comprised of any suitable material (e.g., glass, one or more polymers, a combination thereof, etc.). While each pipe 102 may have a predetermined quantity of strands 104 (e.g., 1024 strands), this is merely an example, and skilled artisans will appreciate the various ways to construct and assemble fiber optic cables, connectors, etc. In the illustrated embodiment, sixteen pipes 102 are shown per cable 100, each pipe 102 having sixteen strands 104; however, this quantity is merely one example. Other implementations may have more or fewer pipes, more or fewer strands per pipe, etc.

As will be appreciated by skilled artisans, fiber optic cable 100 may reduce the overall size and weight of connections 60-94. For example, the use of fiber optic pipes 102 and strands 104 may reduce the cross-sectional area of the cable 100 allowing the cable 100 to be more flexibly routed within vehicle 12. In addition, the weight of fiber optic cables 100 are generally lighter than their traditional metal wire counterparts. This weight reduction, particularly when multiplied across a large number of other connections in the vehicle, can add up to a significant reduction in vehicle weight and improve fuel economy, emissions, etc. In at least one embodiment, where each of the connections 60-94 have a similar construction, using a standard or common cable for a number of local nodes in the vehicle can reduce complexity and cost in the vehicle.

FIG. 2 also illustrates terminations 106 near an end region 109 of each pipe 102 for receiving or delivering light signals (communication data) from/to the master module 20, as will be explained in greater detail below. In addition, as shown in FIG. 2, in at least one embodiment, multiple connections (e.g., such as 60-64) may be coupled or merged into a Y-configuration (2-to-1, 3-to-1, X-to-1)—e.g., so that a single coupling may be made to master module 20, as explained below.

Figure 4:
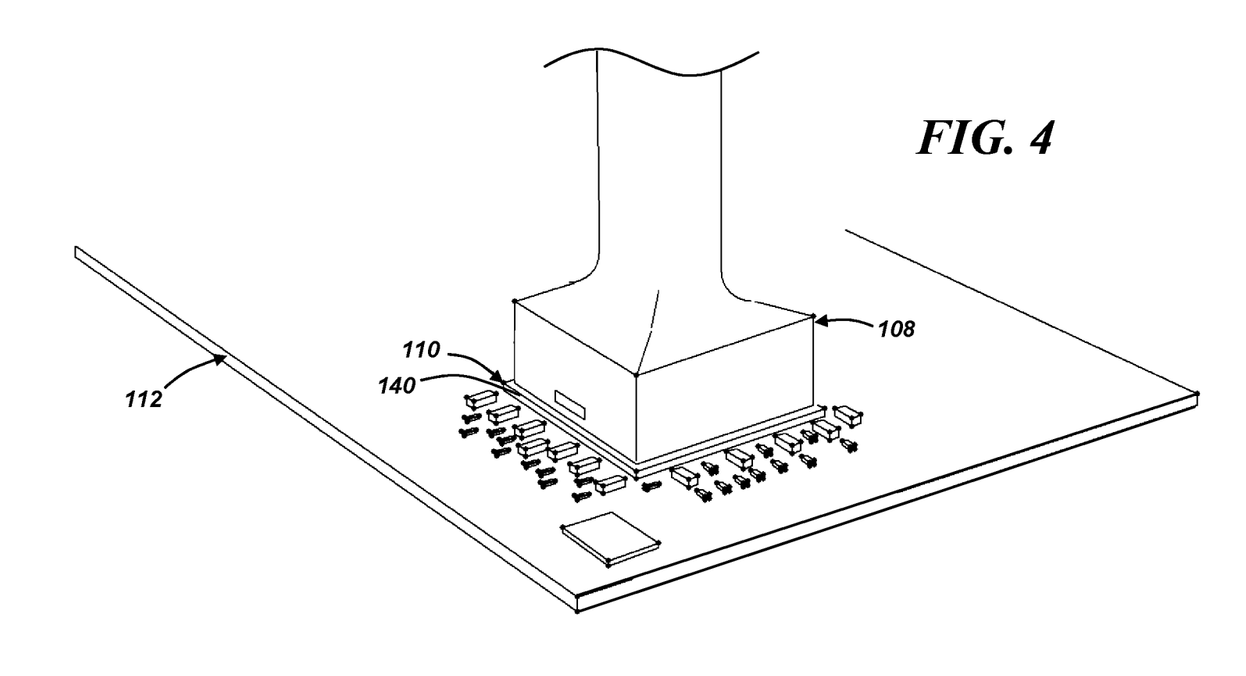
FIG. 4 illustrates a perspective view of the multi-core processing unit enclosed partially within a shroud.

FIG. 2 illustrates a shroud 108 located over the end region 109 of connection 60; see also FIG. 4. The shroud 108 may be adapted to retain and position a number of harnesses 100 and/or light pipes 102 for coupling to a multi-core processing unit or multi-core processor 110 within the master module 20.

Figure 3:
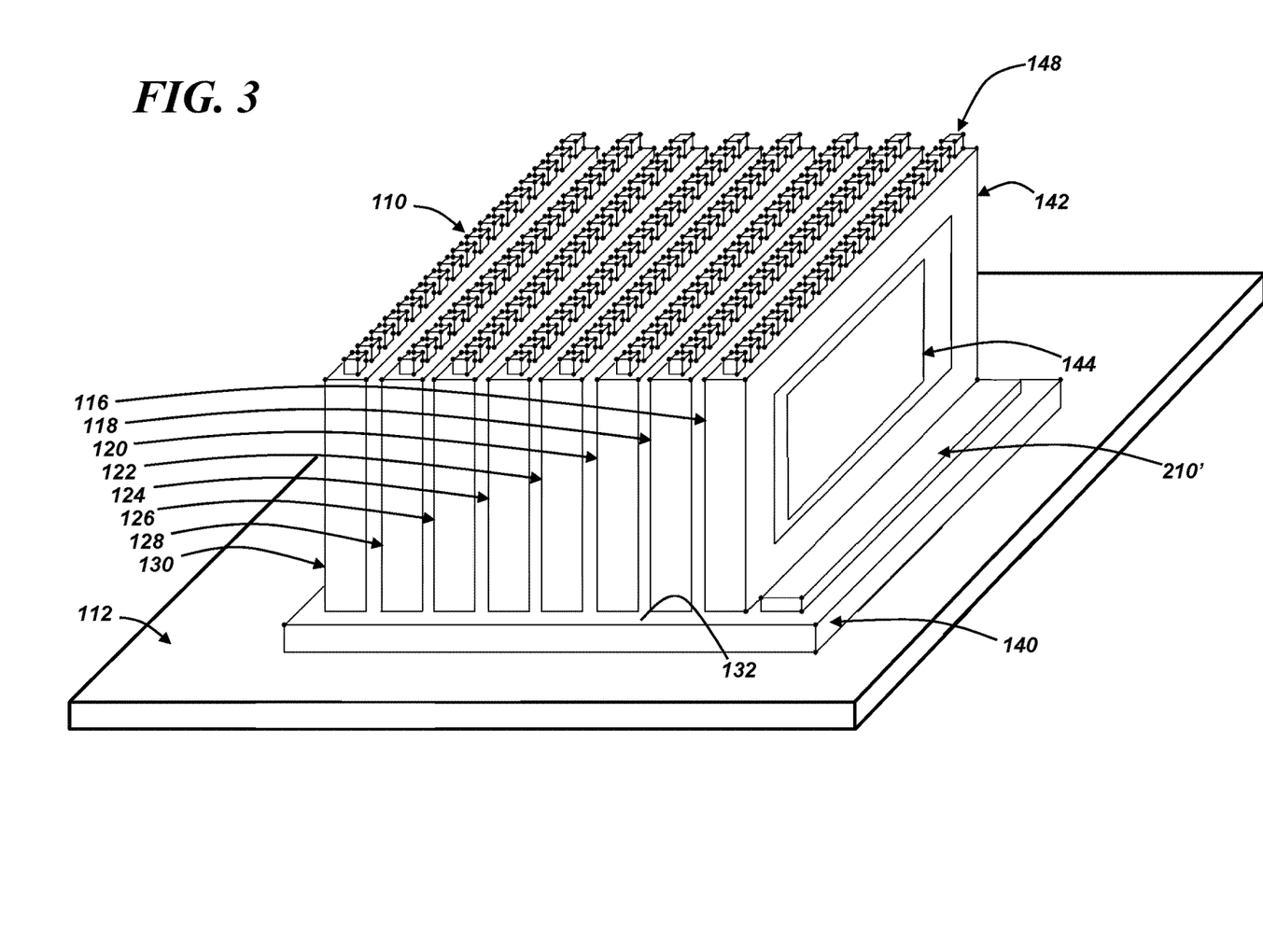
FIG. 3 illustrates a perspective view of an embodiment of a multi-core processing unit.

FIG. 3-4 illustrate the multi-core processor 110 of master module 20 mounted on a circuit card, a circuit card assembly (CCA), a printed circuit board (PCB), or the like 112—processor 110 being configured to carry out various tasks, functions, and operations associated with functional modules 22-56, as described below. FIG. 3 illustrates the processor 110 comprising a plurality of functioning or functional core assemblies (FCAs) 116-130 assembled on an upper or major surface 132 of a managing core assembly (MCA) 140. Thus, as described more below and in at least one embodiment, the FCAs 116-130 are physically (but not electrically) isolated from the circuit card 112, whereas the MCA is both electrically and physically coupled to the circuit card or board 112. Each of the MCA 140 and FCAs 116-130 may have a core CPU. In the illustrated arrangements, MCA 140 is mounted to the circuit card 112—and in FIG. 4, the FCAs 116-130 are hidden beneath shroud 108. As will be explained in greater detail below, the FCAs 116-130 may control the tasks and functions of the functional modules 22-56, while the MCA 140 may coordinate and control the operation of the FCAs 116-130.

Structurally speaking, each FCA 116-130 may be identical; therefore, only one will be discussed below. It should be appreciated that while structural or physical features may be identical from FCA to FCA, at least some FCAs 116-130 may store and execute instructions different from other FCAs. In this manner, localized tasks or functions from a wide variety of vehicle functional modules 22-56 may be performed and/or executed at the multi-core processor 110, rather than having dozens or even hundreds of high speed processors (in functional modules) being dispersed throughout the vehicle 12.

Figure 5:
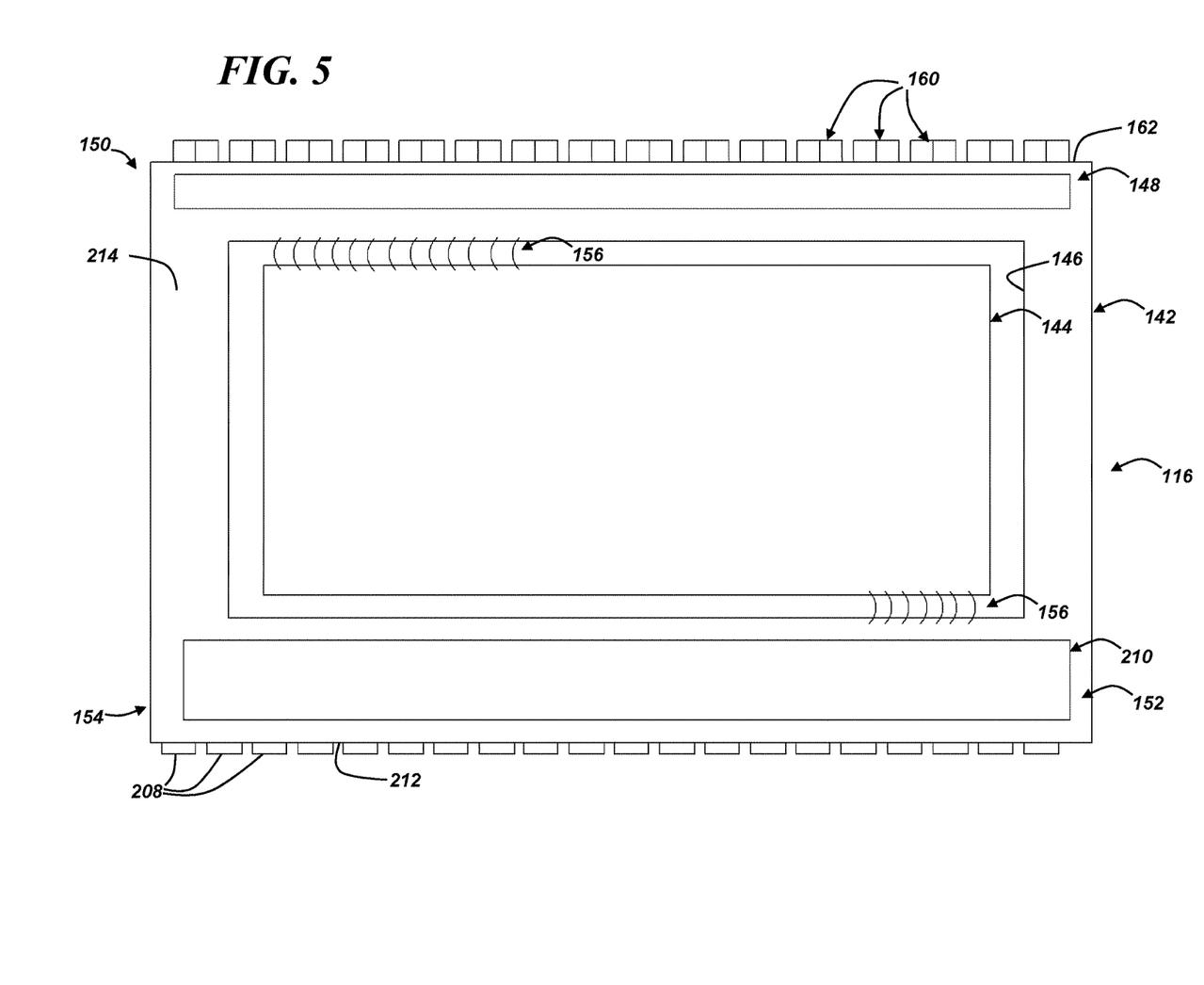
FIG. 5 is an elevation view of one of a plurality of functioning core assemblies (FCAs) of the multi-core processing unit.
Figure 6:
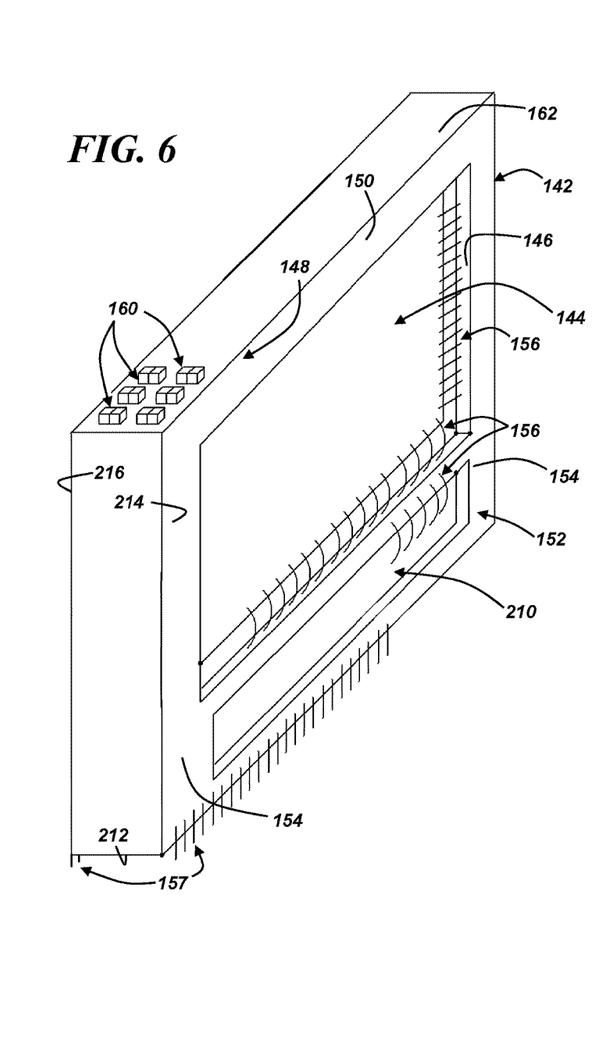
FIG. 6 is a perspective view of one of the FCAs.

As shown in FIGS. 5-6, FCA 116 may include a substrate 142, a core CPU (central processing unit) 144 carried within an opening 146 of the substrate 142, an optical interface circuit 148 (e.g., carried by one segment or member 150 of the substrate 142), and an electrical interface circuit 152 (e.g., carried by a segment or member 154 of substrate 142 that is opposite of member 150). The substrate 142—e.g., commonly referred to a package or packaging substrate—may be rectangularly-shaped and opening 146 may also be rectangular; however, this is merely exemplary (e.g., other shapes are possible). Herein, the side 150 may be referred to as an upper side and side 154 may be referred to a lower side; however, the orientation of the FCA 116 is not so limited. References to orientation such as upper, lower, above, below, and the like are for explanatory purposes only.

The substrate 142 may be comprised of any suitable semiconductor material adapted to provide suitably rigid support for the core CPU 144 and/or for mounting the FCA 116 to the MCA 140, as will be explained more below. Non-limiting examples of substrate material include, among other things, silicon with appropriate doping. For example, the silicon may be appropriately doped to make the necessary circuitry for the application. In addition, as shown in FIG. 5, the substrate 142 may be adapted to carry and isolate a plurality of wire bonds 156 from one another (being embedded within the material thereof). The illustrated wire bonds 156 may carry or suspend the core CPU 144 within the opening 146, and embedded wire bonds (e.g., hidden in FIGS. 5-6) may couple the CPU 144 to the optical interface circuit 148, couple the CPU 144 to the electrical interface circuit 152, and/or couple the core CPU 144 to itself, just to name a few non-limiting examples.

The suspended core CPU 144 may be any suitable commercial processor, microprocessor, or combination thereof. In at least one embodiment, one core CPU 144 is carried by each substrate 142; however, embodiments exist having multiple core CPUs 144 per single substrate 142. Core CPU 144 may be adapted or configured as a RISC (reduced instruction set computing) model or architecture, a Von Neumann model or architecture, a Harvard model or architecture, or any other suitable compilation engine model or architecture. Suitable non-limiting commercial implementations of the core CPU include motor vehicle communication command and control, telecommunications systems, multi-core thinking engines which can be seen in Hyper-cubes and hierarchal master/slave systems. Thus, the core CPU 144 may include, among other things, memory, a control unit, an arithmetic/logic unit (ALU), etc. and may have any suitable arrangement (e.g., with respect to the memory, the control unit, the ALU etc., as well as other architecture such as input/output, data memory, instruction memory, and/or the like).

The optical interface circuit 148, carried by the substrate 142 above the core CPU 144, may include a plurality of optical cells 160 carried by upper member 150 and may function to convert optical signals received over connections 60-94 from functional modules 22-56 into electrical signals directed to, among other things, the core CPU 144. Similarly, the core CPU 144 may send electrical signals to circuit 148 which then are converted into optical signals to be sent over the connections 60-94. The optical cells 160 may be located on an upper edge or outwardly-facing surface 162 of the substrate 142. Each optical 160 cell may be identical; therefore, only one will be described herein. (It should be appreciated that while FIGS. 5 and 6 illustrates optical cells 160 differently, these illustrations are only meant as an example. Thus, the optical cells 160 may be a row of optical cells 160 that extends the length of edge 162 (FIG. 5), two rows of optical cells 160 that extend a portion of the length of edge 162, a combination thereof, or any other suitable arrangement.)

Figure 7:
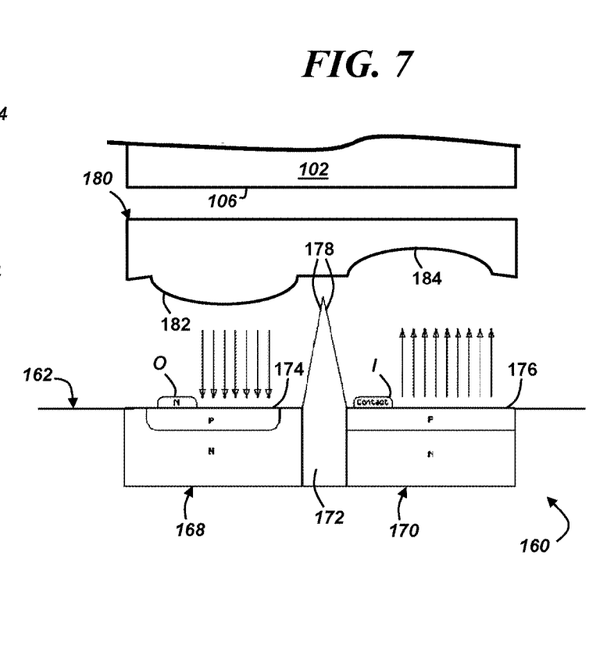
FIG. 7 illustrates a schematic view of a portion of an optical interface circuit of one of the FCAs.

In at least one embodiment, the edge 162 of the substrate 142 is at least partially comprised of a semi-conductive material being doped as an NPN junction, a PNP junction, etc. Further, in at least one implementation, the edge 162 includes an array of NPN junctions (e.g., to accommodate multiple cells 160). FIG. 7 schematically illustrates one embodiment of the optical cell 160 of the optical interface circuit 148. Here, a receiver 168 is in the form of a photodiode that conducts current when light or photonic radiation (inbound photons represented by series of parallel arrows on the left in FIG. 7) strikes the PN junction within the device. Conversely, a transmitter 170 is in the form of a laser diode that emits light or photonic radiation (outbound photons represented by series of parallel arrows on the right in FIG. 7) when current passes through the PN junction within the device. While the illustrated embodiment specifically comprises photodiodes and laser diodes, it should be appreciated that other embodiments exist that use other components.

FIG. 7 also illustrates a spacer or divider 172 located between a surface 174 of receiver 168 and a surface 176 of transmitter 170. The spacer 172 may have a reflective surface or coating 178 to assist in re-directing scattered light—i.e., light received from pipe 102 (toward receiver 168) and/or light transmitted from the transmitter 170 (toward pipe 102).

FIG. 7 also illustrates an optic or lens 180. The optic 180 may be positioned between the surfaces 174, 176 and the termination 106 of one of the pipes 102; and the optic 180 may be oriented so that a convex region 182 of the optic 180 focuses light received from pipe 102 onto receiver surface 174 and so that a concave region 184 focuses light from transmitter surface 176 into the pipe 102. Optic 180 may be comprised of acrylic or any other suitable transparent material. Skilled artisans will appreciate various techniques to design and manufacture the edge 162 described above having multiple optical cells 160. For example, the NPN junction may be surface-mounted on edge 162 or at least partially embedded therein. Further, some embodiments may omit the spacer 172, the optic 180, or both or utilize some other combination of components.

Figures 8, 9:
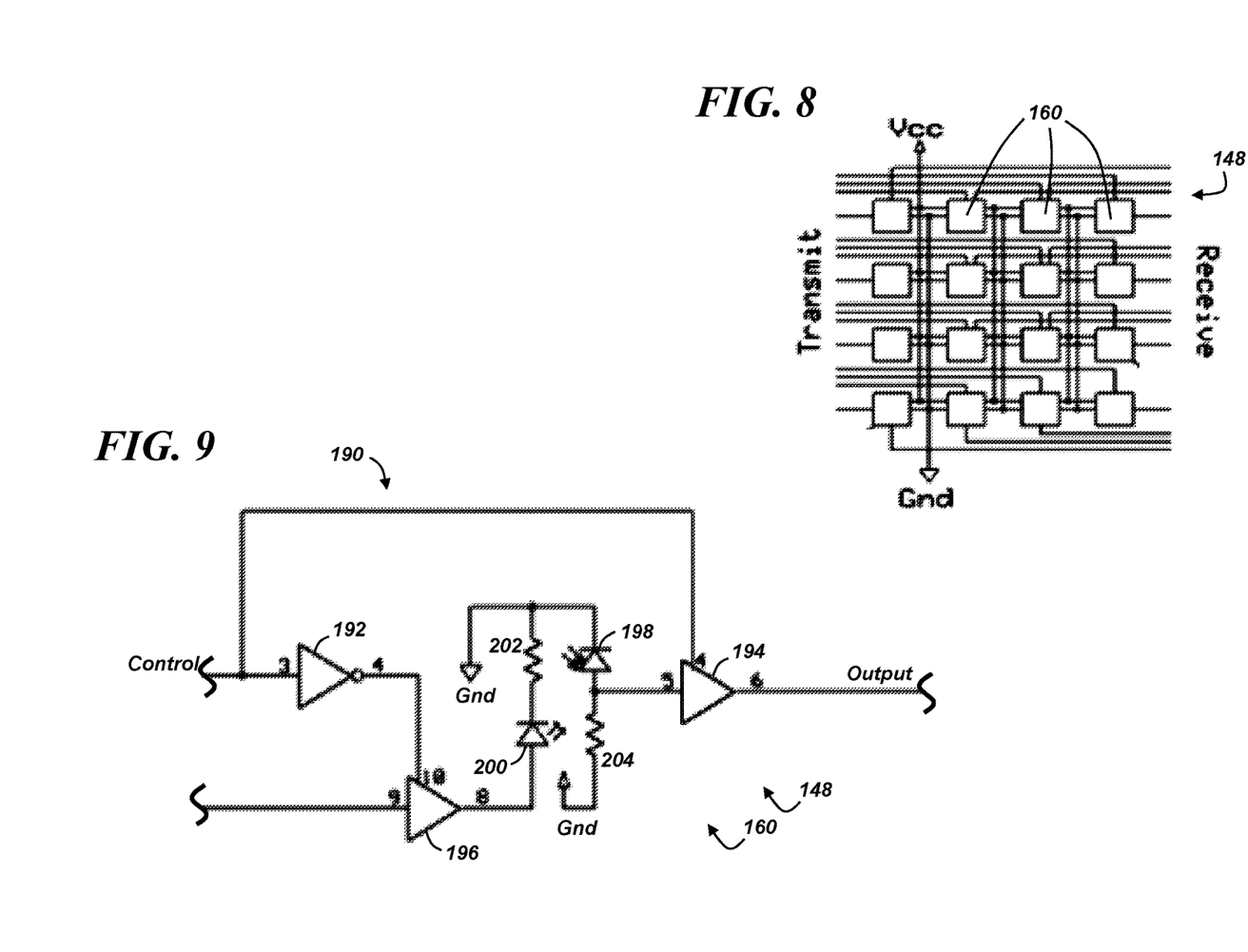
FIG. 8-9 illustrate schematic views of electrical circuit diagrams associated with the optical interface circuit shown in FIG. 7.

FIG. 8 illustrates an electrical schematic of the optical interface circuit 148. Each of the optical cells 160 may be coupled electrically to a common potential voltage (Vcc) and a common ground (Gnd). Further, each cell 160 may be coupled to a TX (Transmit) line and a RX (Receive) line. As will be explained in greater detail below, each optical cell 160 may be toggled between a receive mode and a transmit mode. In the receive mode, a message or communication data may be received from one of the functional modules 22-56 and delivered to the multi-core processor 110. In the transmit mode, a message or communication data may be sent from the processor 110 to at least one of the functional module(s) 22-56. In at least one implementation, the wires and/or traces, etc. of FIG. 8, as well as the electronic components shown in the optical cell 160 of FIG. 9, are carried out by circuits in the material of the substrate 142.

In FIG. 9, a selectable transceiver circuit 190 of a single, exemplary optical cell 160 is shown. Each cell 160 may comprise an inverter 192, a receiver driver 194, a transmit driver 196, the receiver or photo diode 198, the transmitter or laser diode 200, and resistors 202, 204. The optical cell 160 can either transmit or receive data depending on the state of the direction control line on pin 3. For example, when the direction control line is HIGH (e.g., a digital "1"—e.g., 3.5V, 5V, or the like), the receiver driver 194 is active and the optical cell 160 is in a receive mode. And for example, when the direction control line is LOW (e.g., a digital "0"—e.g., 0V), the transmit driver 196 is active and the optical cell 160 is in a transmit mode. The arrangement of elements in circuit 190 is described below with respect to their function.

The circuit 190 may be toggled to the receive mode by the core CPU 144 sending an enable signal (a HIGH signal) to the circuit 190 via the direction control line. When the direction control line is HIGH, the receiver driver 194 is activated at pin 4 while the inverter 192 inverts the direction control line signal to LOW such that the transmit driver 196 is inactivated or deactivated at pin 10. In this scenario, the circuit 190 is functioning as a receiver or is in a receive mode because the data received by the photo diode 198, which is part of a voltage divider that also includes resistor 204, is present at the output of the receiver driver 194 or pin 6.

Conversely, when the direction control line is LOW, the receiver driver 194 is inactivated or deactivated at pin 4 while the inverter 192 inverts the direction control line signal to HIGH such that the transmit driver 196 is activated at pin 10. In this scenario, the circuit 190 is functioning as a transmitter or is in a transmit mode because the data presented to the input of the transmit driver 196 at pin 9 will fire the laser diode 200 causing a stream of photos or light to flow from that device out through the channeling lens 180 and into the light pipe 102. Thus, it will be apparent that in this implementation, the circuit 190 operates in either the receive mode or the transmit mode, but not both simultaneously.

As shown in FIGS. 5-6, in at least one embodiment, the electrical interface circuit 152 may be carried by lower member 154 of substrate 142 and may include a number of wire bonds 156, 157 (FIG. 6), a number of electrical contacts or pads 208 on a lower edge or outwardly-facing surface 212 of substrate 142 (FIG. 5), and/or a data direction register (DDR) or similarly functioning device 210 (FIGS. 5-6). The wire bonds 157 (FIG. 6) and the pads 208 (FIGS. 5, 14) may be used to electrically couple the FCA 116 to the managing core assembly (MCA) 140—or more specifically to electrically couple the core CPU 144, the DDR 210 (optional), and/or the optical interface circuit 148 to the MCA 140. For these couplings, some embodiments may use wire bonds 157, some may use pads 208, and some may use both. In implementations having wire bonds 157, the wire bonds may extend from or near the lower edge 212 of the substrate 142 from both faces 214, 216 (e.g., see FIG. 6).

In embodiments of the FCA 116 that include the DDR (FIGS. 5-6), the DDR 210 may be carried by the lower member 154; e.g., between the opening 146 and the lower edge 212. In general, the DDR 210 may be configured to regulate, and/or otherwise control data flow direction (e.g., input (I) or output (O)) at one or more I/O ports (not shown) between the FCA 116 and MCA 140. In at least one embodiment, the DDR 210 employs three or tri-state logic (e.g., as a tri-state logic device having three states logic "1" or LOW, logic "0" or HIGH, and high impedance Z). As will be appreciated by skilled artisans, when the DDR 210 is enabled, the DDR 210 may behave as ordinary or a common logic device (e.g., having a "0" or "1" state); however, when not enabled, the DDR 210 may go into a state of high impedance (Z) and behave as if it is disconnected from the remainder of the system (e.g., the FCA 116). Of course, in at least one embodiment, the DDR 210 may include multiple tri-state logic devices or the like. Other aspects of the functionality of the DDR 210 will be explained in greater detail below with respect to its function and/or interaction with the MCA 140.

It will be appreciated that some embodiments of the FCA 116 do not include a DDR—e.g., see FIG. 3 illustrating a DDR 210' carried by the MCA 140 instead of the FCAs 116-130. Thus, in at least one embodiment, the multi-core processor 110 may have one or more DDRs—e.g., being carried by one or more of the FCAs 116-130, by the MCA 140, or a combination thereof.

As best shown in FIG. 6, a number of wire bonds 156 may pass-through the substrate 142 for coupling the core CPU 144 to the DDR 210. Furthermore, more wire bonds 157 may extend near the lower edge 212 (of one or both faces 214, 216 of FCA 116) so that the DDR 210 and/or core CPU 144 may be electrically coupled to the MCA 140, as explained more below.

Figures 10, 12:
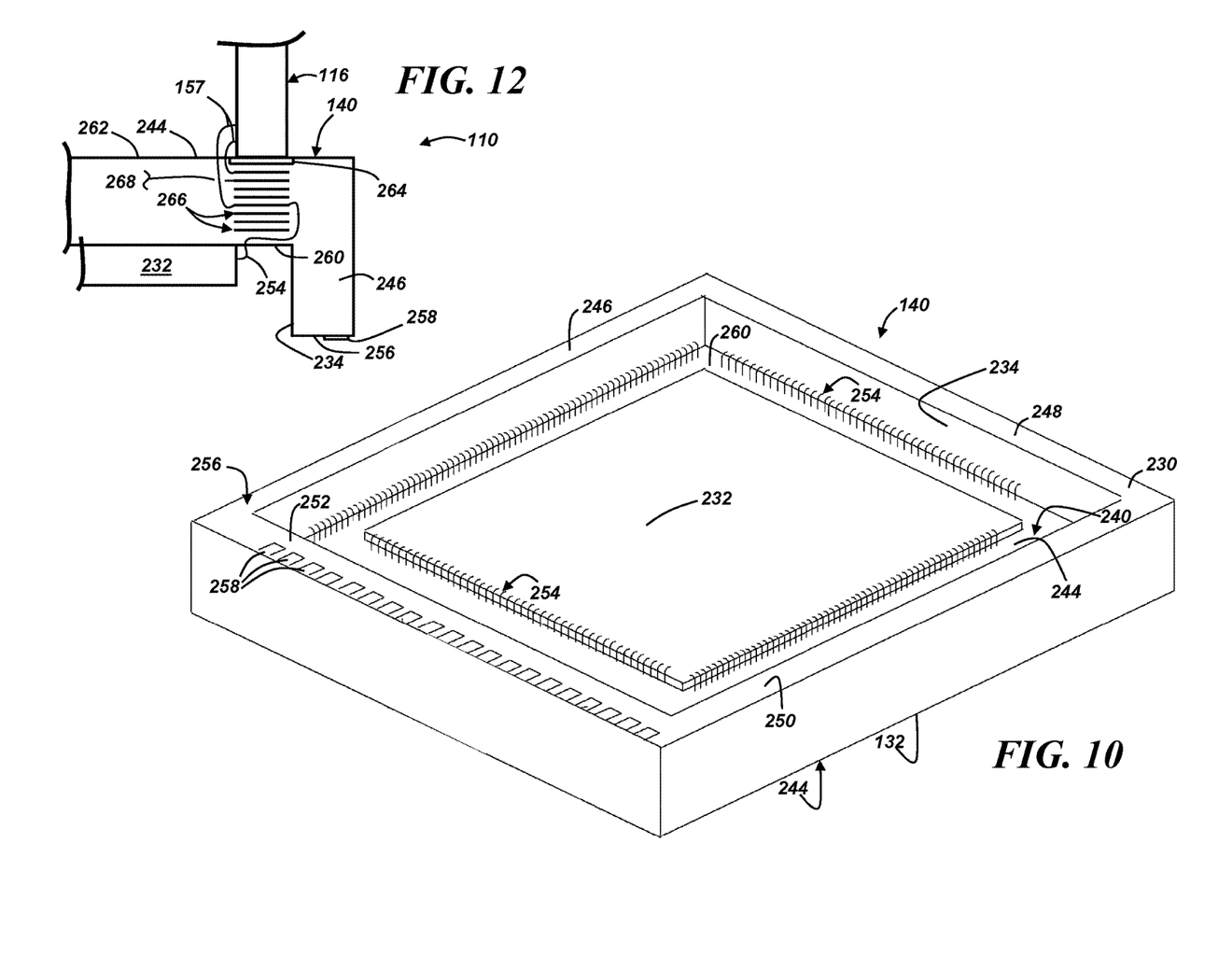
FIG. 10 is a perspective bottom view of a managing core assembly (MCA) of the multi-core processing unit.
FIG. 12 is a partial sectional view of the multi-core processing unit illustrating the electrical buses shown in FIG. 11.

Now turning to the managing core assembly (MCA) 140 which is shown in FIG. 10 in an inverted position (e.g., upside-down). MCA 140 may include a substrate 230, a core CPU 232 carried within a cavity 234 of the substrate 230, and an interconnect circuit or electrical matrix circuit 240 within a floor or base 244 of the substrate 230 (see also FIG. 11). Four extending segments or members 246, 248, 250, 252 may be arranged end-to-end to form the illustrated rectangularly-shaped substrate 230, and the segments 246-252 and base 244 collectively may define the cavity 234. The substrate 230 and floor 244 may carry and isolate a number of wire bonds 254 which electrically couple the MCA core CPU 232 to other components of the multi-core processor 110. And a lower edge 256 of substrate 230 (which faces upwardly in FIG. 10 and is defined by segments 246-252) may have electrical contacts or pads 258 that may be used to couple MCA 140 to circuit card 112 (as arranged in FIG. 3).

In at least one embodiment, the MCA core CPU 232 is mounted onto a lower or second major surface 260 of base 244 (within cavity 234). In at least some embodiments, the physical characteristics of the MCA core CPU 232 may be the same as the CPUs of the FCAs 116-130. Of course, this is not required—e.g., CPU 232 may be faster, slower, have more or fewer inputs and/or outputs, have more or less internal memory, etc. Regardless of the CPU's properties or characteristics, the instructions of core CPU 232 may be different than the FCA core CPUs. For example, CPU 232 may be configured with instructions to control the operation of the FCAs 116-130 and data communication therebetween (e.g., the operating system may reside in the MCA). Thus, while the CPUs of FCAs 116-130 may control operations or perform tasks related to one or more functional modules 22-56, MCA core CPU 232 may control or regulate the flow of communication data to and/or from the FCAs 116-130, as will be described below.

Figure 11:
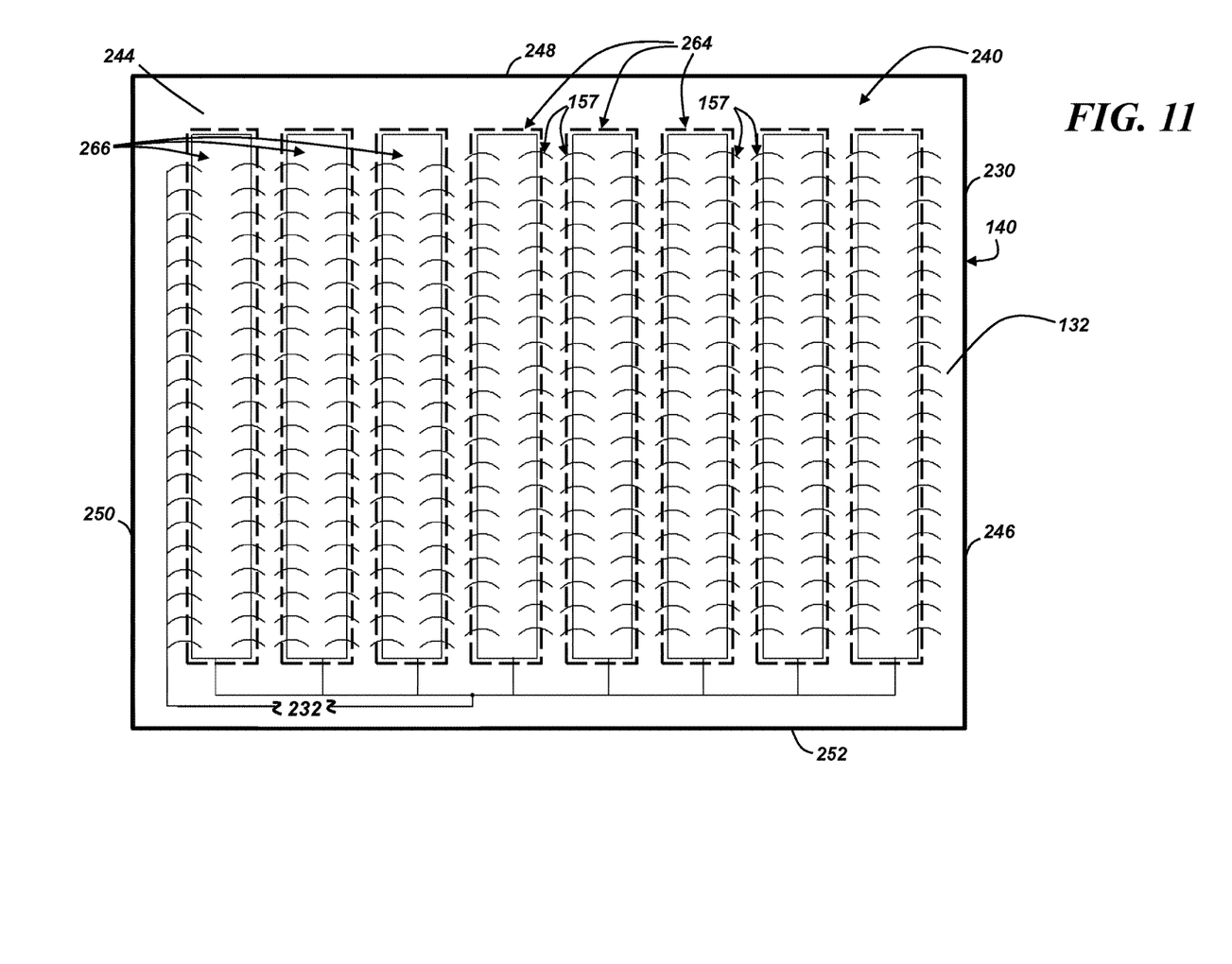
FIG. 11 is a top view of the MCA, also schematically illustrating a number of electrical buses therein.
Figure 14:
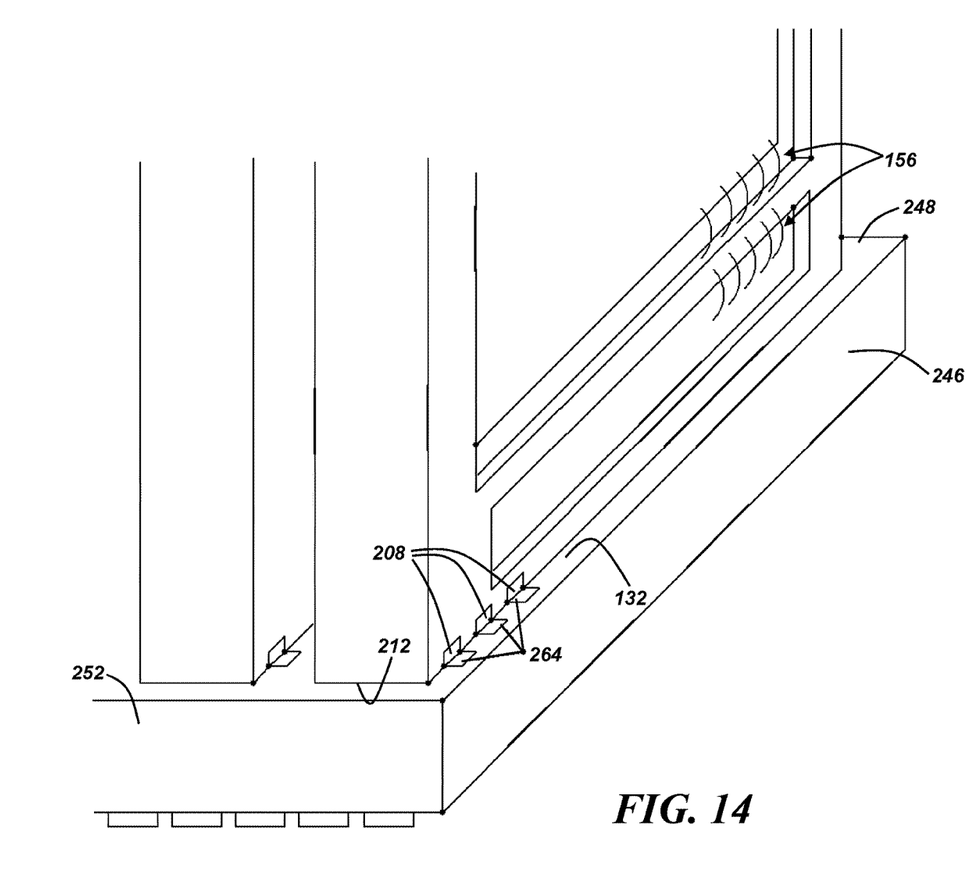
FIG. 14 is an enlarged view of a portion of FIG. 3 illustrating two of the FCAs coupled to the MCA.

As shown in FIG. 11, the upper or major surface 132 of the MCA substrate 230 may comprise a plurality of footprints or regions 264 for mounting and electrically coupling the FCAs 116-130. The footprints 264 may or may not include physical depressions or other mounting features in surface 132 which are adapted to retain the FCAs 116-130 to the MCA 140. FIG. 11 more specifically illustrates a number of rows of electrical connections on substrate 230 which correspond with the footprints 264 and which are adapted to couple wire bonds, electrical pads, or other suitable connection regions of the MCA 140 to the wire bonds, electrical pads, or other suitable connection regions on each of the FCAs 116-130. For example, FIG. 14 illustrates a pad (208)-to-pad (264) connection therebetween.

Figure 13:
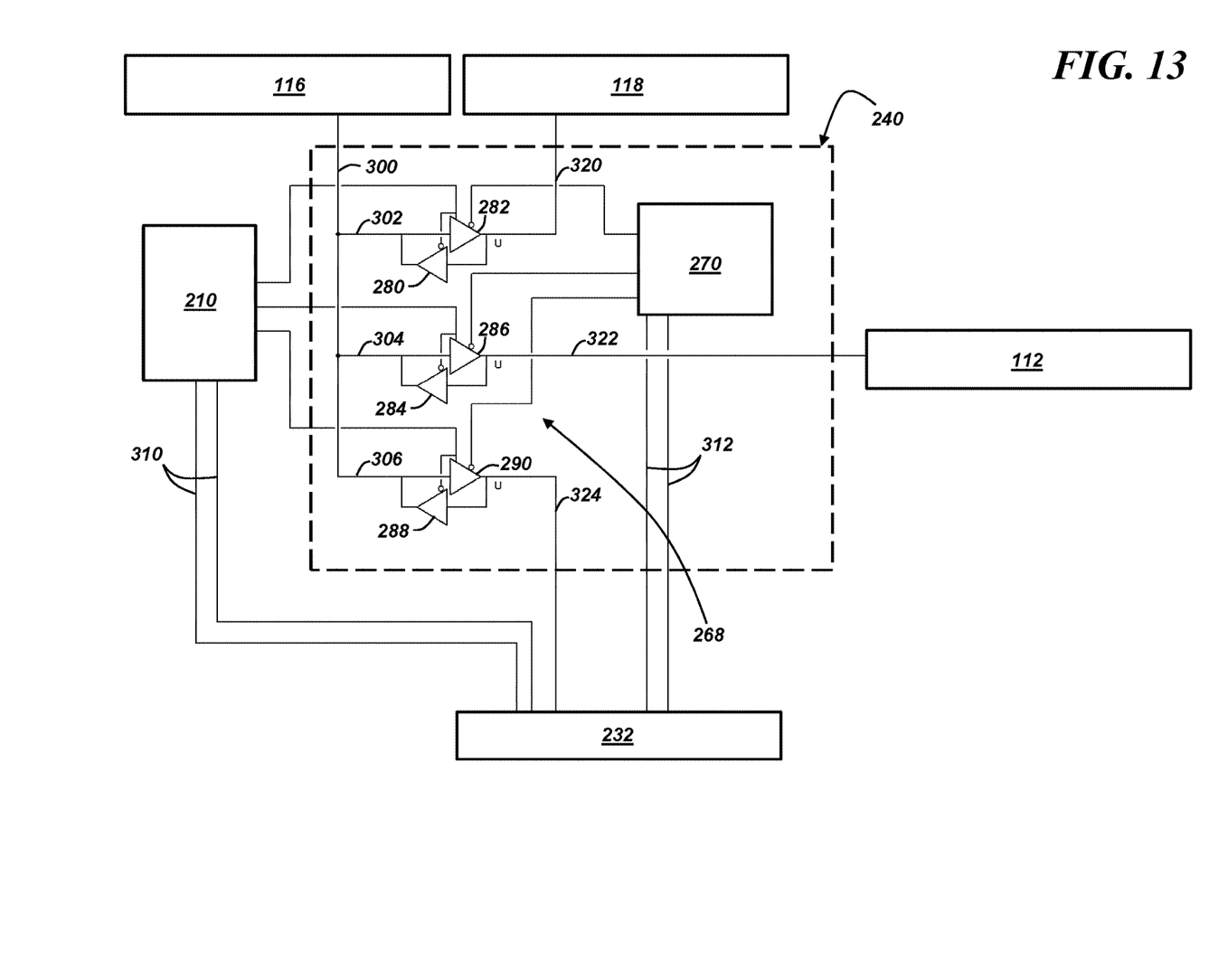
FIG. 13 is an electrical schematic view of a portion of the multi-core processing unit.

As will be explained more below, the matrix circuit 240 may be used by the core CPU 232 to control the flow of electrical data or signals between FCAs 116-130, the MCA core CPU 232, and other electrical devices or modules within the vehicle 12 which may or may not be part of communication system 10. As schematically illustrated in FIGS. 11-13, the matrix circuit 240 in base 244 may include a number of metal layers or electrical buses 266 and the wire bonds 157 (of FCAs 116-130) coupled to those buses 266 (FIGS. 11-12), a switching or selection circuit 268 (FIG. 13) and a controller or control register 270 (FIG. 13, also commonly referred to as a 'data farm'). In FIG. 11, the eight buses 266 are arranged to connect with eight FCAs 116-130 standing on end.

The buses 266 may be spaced from one another and embedded within the material of substrate 230 of the MCA 140, and the number of buses 266 may vary. FIG. 12 illustrates wire bonds 157 (from FCA 116) coupling to at least some of the buses 266 which in turn may be electrically coupled to the CPU 232 via wire bonds 254. This is merely one example of a number of buses beneath the FCA footprints 264 (shown in FIG. 11); other quantities of buses 266, bus arrangements, and the like will be appreciated by skilled artisans.

Ultimately, the buses 266 associated with FCA 116 may be coupled to selection circuit 268 (e.g., via wires or traces), and based on selectable settings or switching within circuit 268, FCA 116 may be configured to transmit or receive electrical signal data to or from one or more of the circuit card 112, the MCA core CPU 232, or another FCA 118-130. In general, the DDR 210—under the actuation control of the CPU 232—may control whether a data path coupled to the FCA 116 is in a transmitting mode or a receiving mode, and when a particular data path (of FCA 116) has been designated as a transmit mode, the register 270—which also is actuated or controlled by the CPU 232—may control when the data may be sent to the respective destinations (e.g., the circuit card 112, MCA core CPU 232, or another FCA 118-130). Thus, the electrical matrix circuit 240 not only facilitates intercommunication between the FCAs 116-130, but also can selectively control the direction of communication therebetween.

As will be explained in detail below, for each destination, a pair of drivers may be used. For example, nine driver pairs may be used, given: seven other FCAs 118-130, the MCA core CPU 232, and other destinations which can be reached via circuit card 112. FIG. 13 illustrates only three exemplary pairs—e.g., as driver pairs to FCAs 120-130 may be substantially the same as or equal to that shown with respect to FCA 118. Of course, in implementations having more or fewer destinations, correspondingly more or fewer driver pairs may be used.

FIG. 13 schematically illustrates that FCA 116 may be coupled to FCA 118, the circuit card 112, and MCA core CPU 232 via alternatively-enabled driver pairs 280-282, 284-286, and 288-290, respectively. When selectively enabled, drivers 282, 286, 290 permit transmission of data from FCA 116 to FCA 118, the circuit card 112, and MCA core CPU 232, respectively. Data from FCA 116 may originate via a single (exemplary) data path 300 (which may branch into several individual input lines 302, 304, 306 to drivers 282, 286, 290, respectively). And conversely, when drivers 280, 284, 288 are selectively enabled, transmission to FCA 116 from each of FCA 118, circuit card 112, and MCA CPU 232 may occur. Thus, it will be appreciated that, if desired, FCA 116 may transmit simultaneously via data path 300 to the FCA 118, the circuit card 112, and MCA core CPU 232; however, in at least one embodiment, transmission from FCA 118, the circuit card 112, and MCA core CPU 232 to FCA 116 via the data path 300 may be delivered serially or sequentially, as explained below where the arrangement is described with respect to its function.

Each of the drivers 280-290 may be enabled by the DDR 210, the register 270, or both. The operation of driver pair 284-286 is illustrative of the operation of any suitable pair; thus, only one pair will be described. Communication data may be transmitted from FCA 116 to circuit card 112 via data path 300, and delivery of the communication data may not occur without CPU 232 properly enabling delivery (via DDR 210 and register 270). For example, upon transmission of a control signal from CPU 232 to DDR 210 (e.g., via path(s) 310), DDR 210 may transmit a HIGH signal, thereby selectively enabling driver 286 (the transmit mode driver) and selectively disabling driver 284 (the receive mode driver). In addition, CPU 232 may control register 270 (e.g., via path(s) 312) to permit transmission from FCA 116 to circuit card 112—e.g., when the CPU 232 knows the circuit card 112 is ready or able to receive the communication data from FCA 116. Thus, register 270 may provide a control signal (a LOW signal) to driver 286 thereby enabling driver 286 to pass the communication data therethrough to circuit card 112 via an output line 322 (e.g., drivers 282 and 290 having corresponding output lines 320, 324). Therefore, in at least one embodiment, even if FCA 116 transmits communication data via paths 300 and 304 and even if DDR 210 enables driver 286, no communication data will be received by circuit card 112 unless register 270 enables driver 286 as well.

When DDR 210—under the control of CPU 232—selectively switches the drivers 280-290 to the receive mode, drivers 282, 286, 290 are disabled and drivers 280, 284, 288 are enabled to receive. Continuing with the example, above, data from circuit card 112 will pass through driver 284 and be received by FCA 116 via data paths 304, 300. It should be appreciated that DDR 210 is not required to switch all drivers or driver pairs to operate in the receive mode or the transmit mode (e.g., concurrently). For example, DDR 210 selectively may select any of the driver pairs to operate in the receive mode while others are configured to operate in the transmit mode. In this scenario, if the pair is configured to operate in the receive mode during a transmission from FCA 116, no communication data will pass through either of the drivers.

In at least one embodiment, data from multiple devices being transmitted to FCA 116 may be received serially. According to one embodiment, for example, when data from circuit card 112, FCA 118, and core CPU 232 is transmitted concurrently to FCA 116, the data may be buffered or otherwise controlled to avoid collisions. For example, while not illustrated in the circuit shown in FIG. 13, a data buffer may be used. Or the core CPU 232 may control the timing of at least some transmissions to FCA 116. In another implementation, data path 300 is coupled to the one of the buses 266 and all message traffic or communication data received by FCA 116 is received over the bus(es) 266—e.g., having header data and the like. Other implementations are also possible; e.g., the system can be used in any configuration including, but not limited to, serial, parallel, or any combination thereof.

It should be appreciated that data path 300 is merely one path from or to FCA 116. And FCA 116 may have many similar data paths as well (e.g., hundreds, thousands, etc.). Similarly, in at least one embodiment, the matrix circuit 240 may have additional driver pairs associated with each additional data path. Thus, the schematic view in FIG. 13 is merely an example of the architecture of the matrix circuit 240.

Assembly of the multi-core processor 110 includes assembling each of the FCAs 116-130 onto the upper surface 132 of the MCA 140 and establishing the appropriate electrical connections of the wire bonds 157 or electrical pads 208, 264 therebetween. In one embodiment, the FCAs 116-130 are oriented perpendicular to surface 132; however, this is not required. The processor 110 may be mounted on circuit card 112 using pads 258 thereby establishing electrical connections with the circuit card 112 and other devices coupled to the circuit card 112. Fiber optic connections 60-94 may be established between the optical interface circuits 148 of the master module 20 (between the FCAs 116-130) and the functional modules 22-56. According to one embodiment, connections 60-94 may terminate at the multi-core processor 110—so that, more specifically, each pipe 102 of connections 60-94 may be coupled to a different optical cell 160 of the FCAs 116-130. Vehicle tasks which are related or otherwise associated may be executed or processed by a common FCA; and hence, suitable optical connections between various modules 22-56 and a single FCA may be established. Once the pipes 102 are coupled to the multi-core processor 110, the shroud 108 may be located over the bundle of pipes 102.

During operation, the multi-core processor 110 may communicate concurrently with various modules 22-56 and facilitate intra-processor communication (i.e., communication between core CPUs 144 of the various FCAs 116-130). As discussed in the collision avoidance system example above, the functional modules 22-56 may utilize the processing resources of the multi-core processor 110—more specifically, at least one core CPU 144 of the one or more FCAs 116-130. For example, a functional module 22 may communicate with FCA 116 via optical harness 100 and optical interface circuit 148—the interface circuit 148 controlling whether optical cells 160 operate in a receive mode or a transmit mode. For example, where the optical cells 160 are configured to the receive mode and upon receipt of data at the core CPU 144, the CPU may process the data or otherwise perform or execute instructions or operations (e.g., to determine whether a collision scenario is present). The CPU 144 then could selectively switch one or more cells 160 of the interface circuit 148 to a transmit mode and send communication data, commands, or the like to the functional module 22. Similar operations may occur concurrently (e.g., in parallel) with one or more other modules 24-56.

In addition, while the module 22 could communicate independently with another FCA of the processor 110, in at least one embodiment, any intra-processor communication may be carried out using the MCA 140. For example, if FCA 116 needed to transmit communication data or the like to FCA 118, MCA 140 may selectively control the matrix circuit 240 in order to facilitate such a transmission. More specifically, under the direction and control of core CPU 232, DDR 210 and register 270 may enable driver 282 (FIG. 13) so that data transmission from FCA 116 to FCA 118 along data path 300 may occur. And if FCA 118 needs to transmit to FCA 116, under the direction and control of core CPU 232, DDR 210 may disable driver 282 and enable driver 280 (FIG. 13) so that data transmission from FCA 118 to FCA 116 may occur. Of course, this is a simplified example. In practice, FCA 116 may need to communicate with multiple FCAs 118-130 and via multiple data paths (e.g., data path 300 and others like it). Core CPU 232 may control and facilitate such communications concurrently (e.g., in parallel); further, CPU 232 may control and facilitate operations for multiple vehicle systems concurrently—e.g., not just the exemplary collision avoidance system described herein.

The multi-core processor 110 provides a substantial increase in computing power in a relatively small package size. For example, in the illustrated embodiment, the processor 110 includes, among other things, eight functional cores 144, a single managing core 232, and the matrix circuit 240 that interconnects the cores 144 to core 232. This rectangular package may be mounted to circuit board 112 using a single interface 258—thus, e.g., a smaller circuit board may be used than would otherwise be required to mount nine core CPUs. Since the processor 110 is adapted to communicate via fiber optic cables 100, it is suited for a vehicle's centralized processing environment—e.g., where high response times are often required (e.g., for vehicle safety and other purposes). Moreover, as described above, a separate electro-optical transceiver is not required, as the optical interface circuit 148 can be integral to the processor 110. The communication system 10 in its entirety also represents a significant size and weight reduction—coupled with increased performance.

It should be appreciated that other implementations of the multi-core processor 110 are also possible, including embodiments with more or fewer FCAs or FCA core CPUs and/or multiple MCA core CPUs. Thus, the illustrations are merely one embodiment.

Thus, there has been described a communication system having a master module and a plurality of functional modules coupled to and at least partially controlled by the master module; optical couplings between the master and functional modules may include fiber optic cable having fiber optic pipes and strands. The master module may include a multi-core processing unit—i.e., a processing unit having at least two functional core assemblies (each having a core CPU) that are controlled by a managing core assembly (having its own CPU). In at least one embodiment, the managing core assembly is coupled to a circuit card in the master module, whereas the at least two functional core assemblies are coupled to the managing core assembly. Further, the managing core assembly may be adapted to selectively permit communication between any one of the functional core assemblies and another functional core assembly, between any one of the functional core assemblies and the managing core assembly, or between any one of the functional core assemblies and the circuit card itself (which may be coupled to other electrical devices in the vehicle). In at least one embodiment, this selective communication may be facilitated by an electrical matrix circuit in the managing core assembly which includes a number of switching elements (e.g., such as a data direction register and/or other data registers or farms) which, when controlled by the CPU of the managing core assembly, enable transmission or reception of communication data to and from the functional core assemblies.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle communication system, comprising:
   a plurality of functional system modules; and
   a master system module coupled to the plurality of functional system modules, the master system module comprising:
      a multi-core processing unit that includes:
         a plurality of functioning core assemblies (FCAs), each having a substrate carrying a core central processing unit (CPU) and an optical interface circuit carried by a first edge of the substrate, wherein the optical interface circuit is adapted to enable communication between the respective FCA and at least one of the plurality of functional system modules; and
         a managing core assembly (MCA) comprising a substrate having a first major surface and a second major surface,
      wherein the first major surface includes a plurality of rows of electrical connections,
      wherein each of the plurality of rows of electrical connections is adapted to couple with one of the plurality of FCAs to enable communication between the core CPU of the MCA and the core CPUs of the plurality of FCAs,
      wherein each of the plurality of FCAs have a second edge that abuts the first major surface at one of the plurality of rows, wherein the second edge is opposite the first edge through a height of the respective FCA.

2. The system of claim 1, wherein each core CPU of each of the plurality of FCAs is suspended by wire bonds within an opening of the respective FCA substrate.

3. The system of claim 1, wherein each respective substrate of the plurality of FCAs includes a plurality of electrical pads at the second edge, a plurality of wire bonds proximate to the second edge, or both, wherein the plurality of pads, the plurality of wire bonds, or both are coupled to the plurality of rows of electrical connections on the MCA.

4. The system of claim 1, wherein the optical interface circuit includes a plurality of optical cells, wherein each of the plurality of optical cells are configured to be selectively switched between a transmit mode or a receive mode.

5. The system of claim 4, wherein the core CPU of each respective FCA is adapted to control selective switching between the transmit and receive modes of the plurality of optical cells associated with the respective FCA.

6. The system of claim 1, wherein the optical interface circuit includes a plurality of optical cells is adapted to couple to an optical cable comprised of a plurality of optical pipes, each of the plurality of optical cells corresponding to one of the plurality of optical pipes.

7. The system of claim 1, wherein the MCA further comprises an electrical matrix circuit carried by the substrate of the MCA that is adapted to selectively enable communication between the core CPUs of the plurality of FCAs.

8. The system of claim 1, wherein the MCA further comprises an electrical matrix circuit that includes a plurality of alternatively-enabled driver pairs, wherein, when actuated by the core CPU of the MCA, at least one of the plurality of alternatively-enabled driver pairs is adapted to change a communication direction between a first functioning core assembly (FCA) and a second FCA, between the first FCA and the MCA, or between the first FCA and a circuit card coupled to the multi-core processing unit.

9. The system of claim 8, wherein the electrical matrix circuit further comprises a data direction register (DDR), wherein, when the DDR is actuated by the core CPU of the MCA, the DDR enables a first driver and disables a second driver of the at least one of the plurality of alternatively-enabled driver pairs.

10. The system of claim 8, wherein the electrical matrix circuit further comprises a control register, wherein, when the control register is actuated by the core CPU of the MCA, the control register enables one driver of the plurality of alternatively-enabled driver pairs thereby permitting communication from the first FCA to pass through to the second FCA, the MCA, or the circuit card.

11. The system of claim 1, wherein the master system module further comprises a circuit card, wherein the substrate of the MCA includes a plurality of electrical contacts that electrical couple the core CPUs of the MCA and the plurality of FCAs to the circuit card.

12. The system of claim 11, wherein the plurality of FCAs are physically isolated from the circuit card.

13. A multi-core processing unit adapted to be carried by a circuit card, comprising:
   a managing core assembly (MCA), comprising:
      a substrate having a base carrying a core central processing unit (CPU);
      an electrical matrix circuit coupled to the core CPU of the MCA; and
      a plurality of contacts on the substrate adapted to establish electrical connection with the circuit card;
   a first functioning core assembly (FCA); and
   a second functioning core assembly (FCA),
   wherein each of the first and second FCAs comprise a substrate, each FCA substrate carrying a core CPU, wherein the substrates of the first and second FCAs are carried by a major surface of the MCA, wherein, via the matrix circuit, the core CPU of the MCA is configured to control communication between the core CPUs of the first and second FCAs.

14. The multi-core processing unit of claim 13, wherein each of the first and second FCAs include an optical interface circuit adapted to enable communication with the first and second FCAs via an optical harness.

15. The multi-core processing unit of claim 13, wherein a first edge of each of the substrates of the first and second FCAs are coupled to the major surface of the MCA, wherein each of the first and second FCAs further comprise a plurality of optical cells at a second edge of the respective substrates, the respective second edges being opposite the respective first edges through a respective height of the first and second FCAs.

16. The multi-core processing unit of claim 13, wherein the first and second FCAs perpendicularly abut the major surface of the MCA and are electrically coupled thereto via a plurality of wire bonds, a plurality of electrical contacts, or both.

17. The multi-core processing unit of claim 13, wherein the electrical matrix circuit includes a plurality of alternatively-enabled driver pairs, wherein, when actuated by the core CPU of the MCA, at least one of the plurality of alternatively-enabled driver pairs is adapted to change a communication direction between the first FCA and the second FCA, between the first FCA and the MCA, or between the first FCA and the circuit card.

18. The multi-core processing unit of claim 17, wherein the electrical matrix circuit further comprises a data direction register (DDR), wherein, when the DDR is actuated by the core CPU of the MCA, the DDR enables a first driver and disables a second driver of the at least one of the plurality of alternatively-enabled driver pairs.

19. The multi-core processing unit of claim 17, wherein the electrical matrix circuit further comprises a control register, wherein, when the control register is actuated by the core CPU of the MCA, the control register enables one driver of the plurality of alternatively-enabled driver pairs thereby permitting communication from the first FCA to pass through to the second FCA, the MCA, or the circuit card.

* * * * *